INVENTORS
Otto Hoffmann
Alexander Krynytzky
by Popp and Sommer
Attorneys.

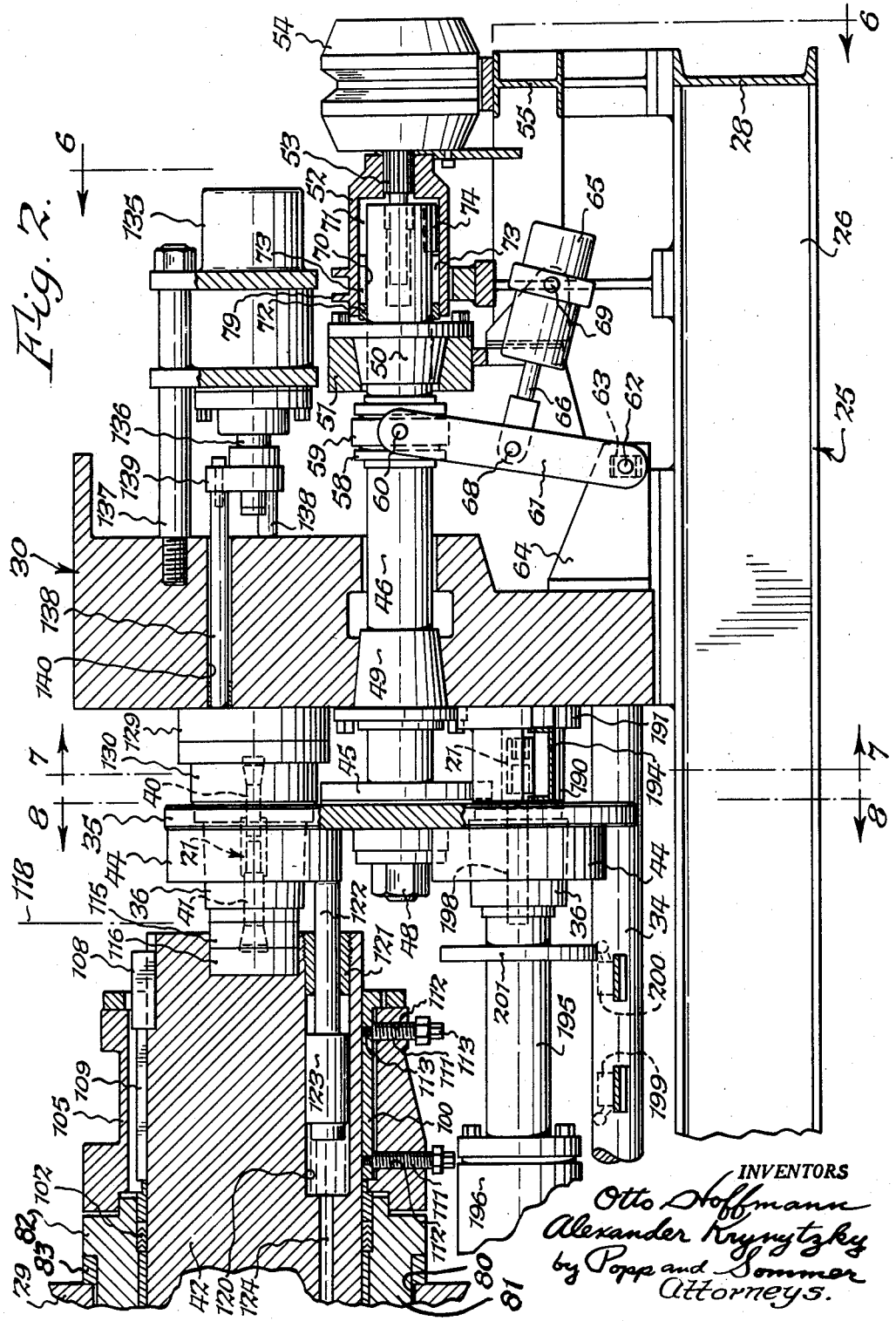

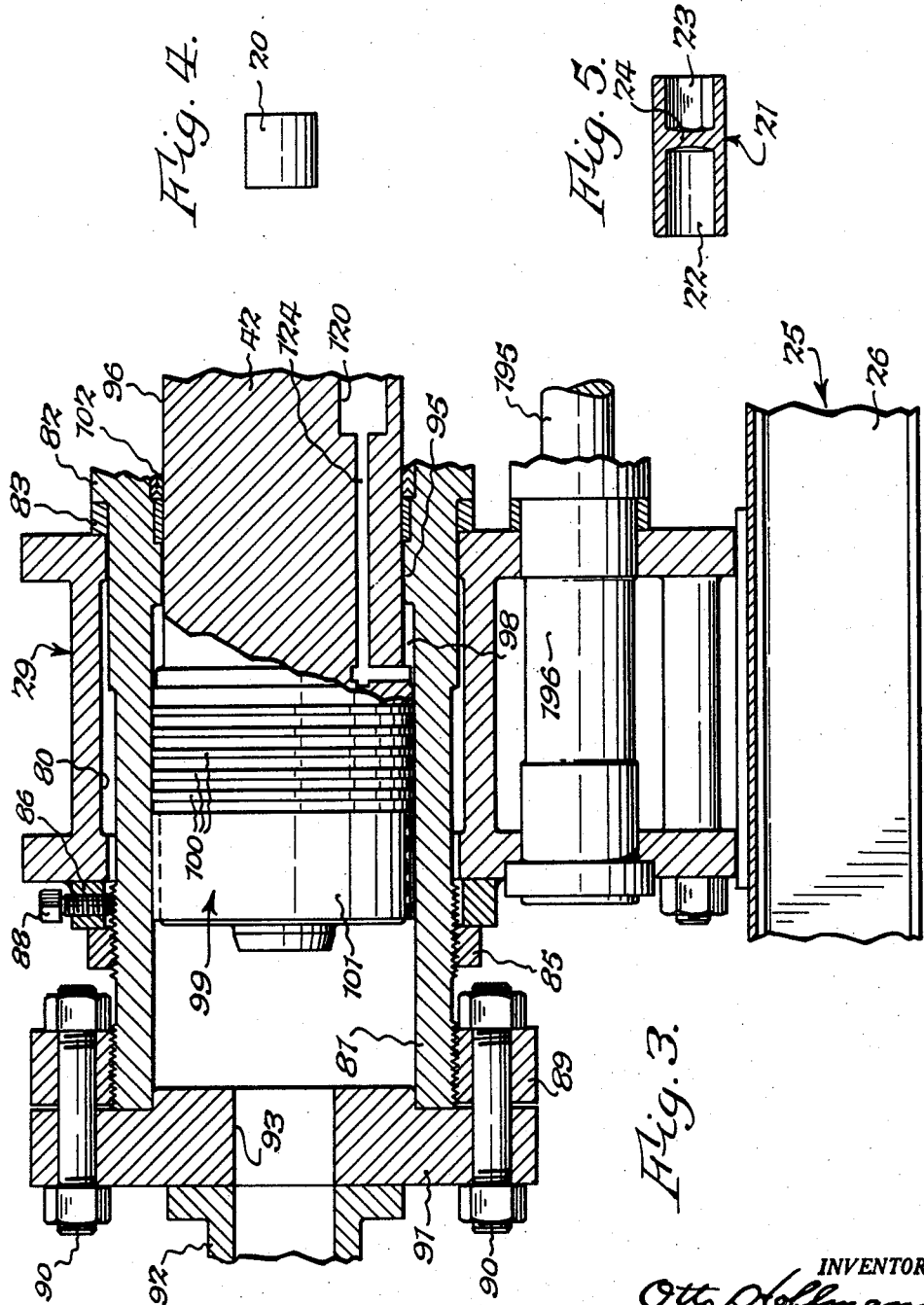

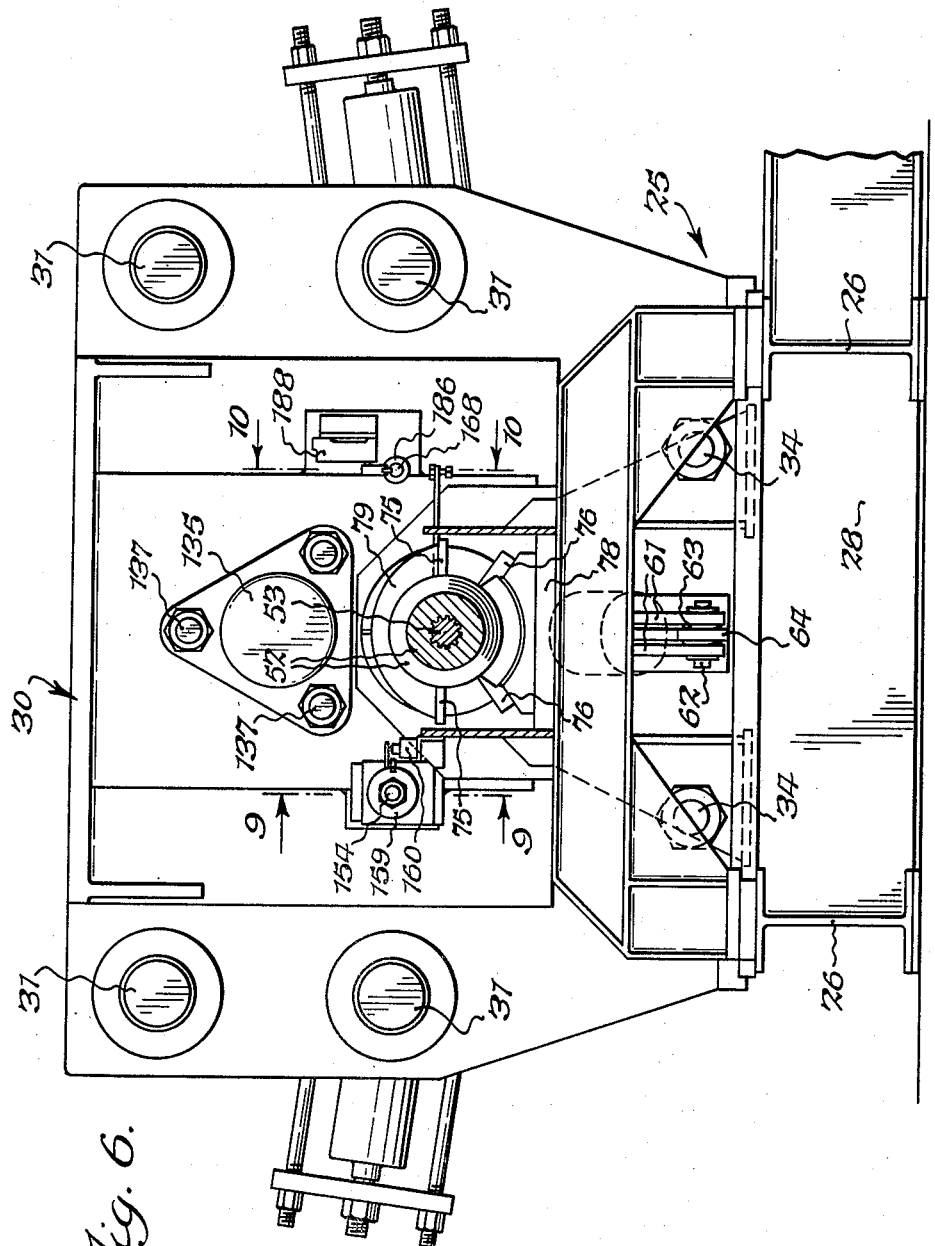

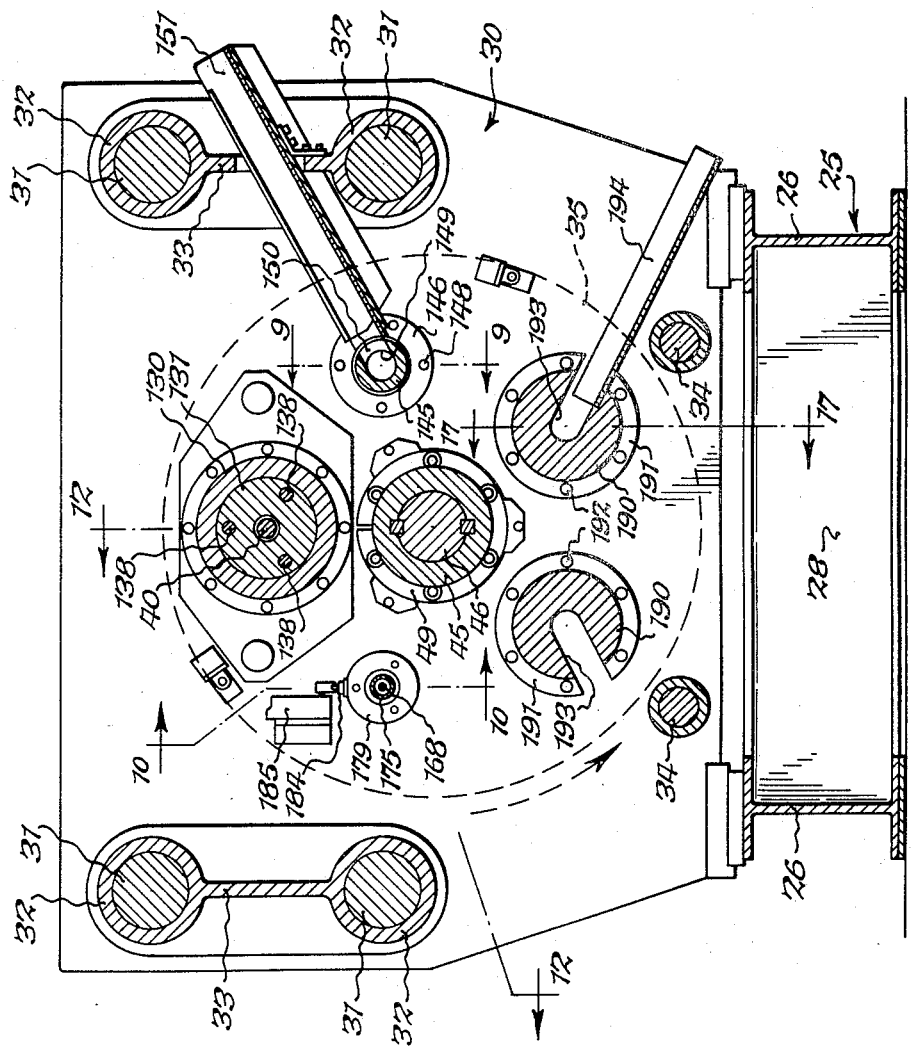

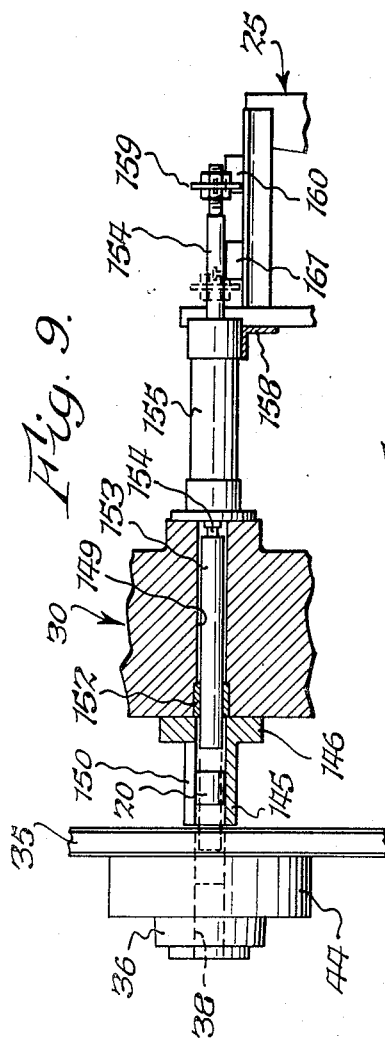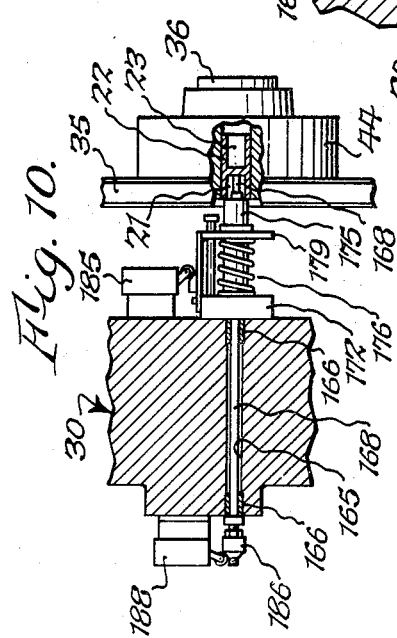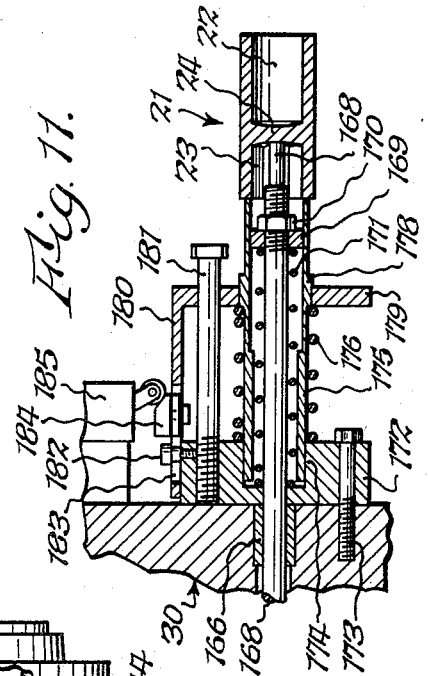

Aug. 16, 1960  O. HOFFMANN ET AL  2,949,051
COLD EXTRUSION PRESS
Filed April 12, 1957  8 Sheets-Sheet 8

INVENTORS
Otto Hoffmann
Alexander Krynytzky
by Poppe and Sommer
Attorneys.

United States Patent Office 2,949,051
Patented Aug. 16, 1960

2,949,051
COLD EXTRUSION PRESS

Otto Hoffmann, Kenmore, and Alexander Krynytzky, Ebenezer, N.Y., assignors to Lake Erie Machinery Corporation, a corporation of New York Filed Apr. 12, 1957, Ser. No. 652,522

13 Claims. (Cl. 78—18)

This invention relates to a cold extrusion press and more particularly to a horizontal extrusion press in which metal billets are extruded or deformed into cup-shaped articles of true and polished inside and outside finish and size.

One of the principal objects of the present invention is to provide such an extrusion press which will operate upon high carbon steels having poor flow characteristics, such as 10 to 35 carbon steel, and produce true and highly polished, both inside and outside, cup-shaped extrusions.

Another object is to provide such an extrusion press having a high capacity, a press embodying the present invention being in production of double concave ended torsion bar couplers at the rate of from 525 to 720 per hour, the production being one at a time.

Another important object is to provide such a press having a plurality of open-ended cavity dies which are simultaneously being operated upon, these dies being arranged in a rotary dial which is associated with other mechanisms so that a billet is being loaded in one while a billet is being extruded in another, while at the same time sensing devices are operative to detect a defective extrusion, and hence a broken punch, and an ejector is removing another extrusion from the dial.

Another object is to provide such a multi-cavity dial which operates in conjunction with both a fixed and a movable punch, the dial being moved axially toward and from the platen carrying the fixed punch to permit of the insertion and withdrawal of the fixed punch.

Another object is to provide an extremely simple mounting for the shaft carrying the dial and a simple and effective mechanism for reciprocating this shaft to move the dial into and out of operative and inoperative relation to the fixed punch as well as the billet feeding, sensing, extrusion, and discharge devices.

Another object is to provide a simple adjustment for the shaft carrying the multi-cavity dial to insure proper alinement of the successive cavities with the punches.

Another object is to provide an extremely simple and effective mechanism for rotatively advancing the dial and its shaft step-by-step at high speed and with the high degree of accuracy required to bring the successive cavities into exact register with the fixed and movable punches.

Another object is to provide a simple and effective mechanism for feeding a billet into each die on the dial as the dial rotates step-by-step to bring the dies successively into alinement with the feeding device.

Another object is to provide a simple and sturdy mounting for the fixed spindle.

Another aim is to provide a simple and reliable mechanism for extracting the fixed punch from the extrusion without damage to the fixed punch or die and without strain upon the relatively light dial which carries the die housing the extrusion from which the fixed punch must be extracted through the application of considerable force.

Another purpose is to provide a simple and reliable mechanism for extracting the movable punch from the extrusion without damage to the movable punch or die and without strain upon the relatively light dial which carries the die housing the extrusion from which the movable punch must be extracted through the application of considerable force.

Another object is to provide a simple and effective detector of a broken punch which operates through devices which feel the extrusion and are operative to detect either a broken fixed or movable punch through detecting a corresponding malformation of the extrusion.

Another object is to provide a simple and effective mechanism for ejecting each extrusion from its die without damage to the extrusion or die and without strain upon the relatively light dial which carries the die from which the extrusion must be ejected through the application of considerable force.

Another object is to provide a simple and effective adjustment for the aim of the main ram carrying the movable punch so that the corresponding cavity in the extrusion will be exactly located.

Other objects and advantages of the invention will be apparent from the following description and accompanying drawings in which:

Figs. 2 and 3 are vertical fragmentary longitudinal sections through the extrusion press, these sections being taken on line 2—3, Fig. 1, and being continuations of one another.

Fig. 4 is a side elevation of a billet used in producing the finished cup-shaped extrusion.

Fig. 5 is a vertical longitudinal section through the finished product which the machine is assumed to be producing, this being a double concave ended coupler for torsion rods or the like.

Fig. 6 is a vertical transverse section taken generally on line 6—6, Fig. 2.

Figs. 7 and 8 are vertical transverse sections taken generally along the correspondingly numbered lines on Fig. 2.

Fig. 9 is an enlarged fragmentary longitudinal section taken generally along lines 9—9, Figs. 6 and 7, and particularly showing the details of the billet loader.

Fig. 10 is a vertical longitudinal fragmentary section taken generally on lines 10—10, Figs. 6 and 7 and illustrating a sensing mechanism for detecting any imperfect extrusions and hence any broken punches.

Fig. 11 is an enlarged sectional view similar to Fig. 10 and showing the sensing mechanism in section and in greater detail.

Figure 1:
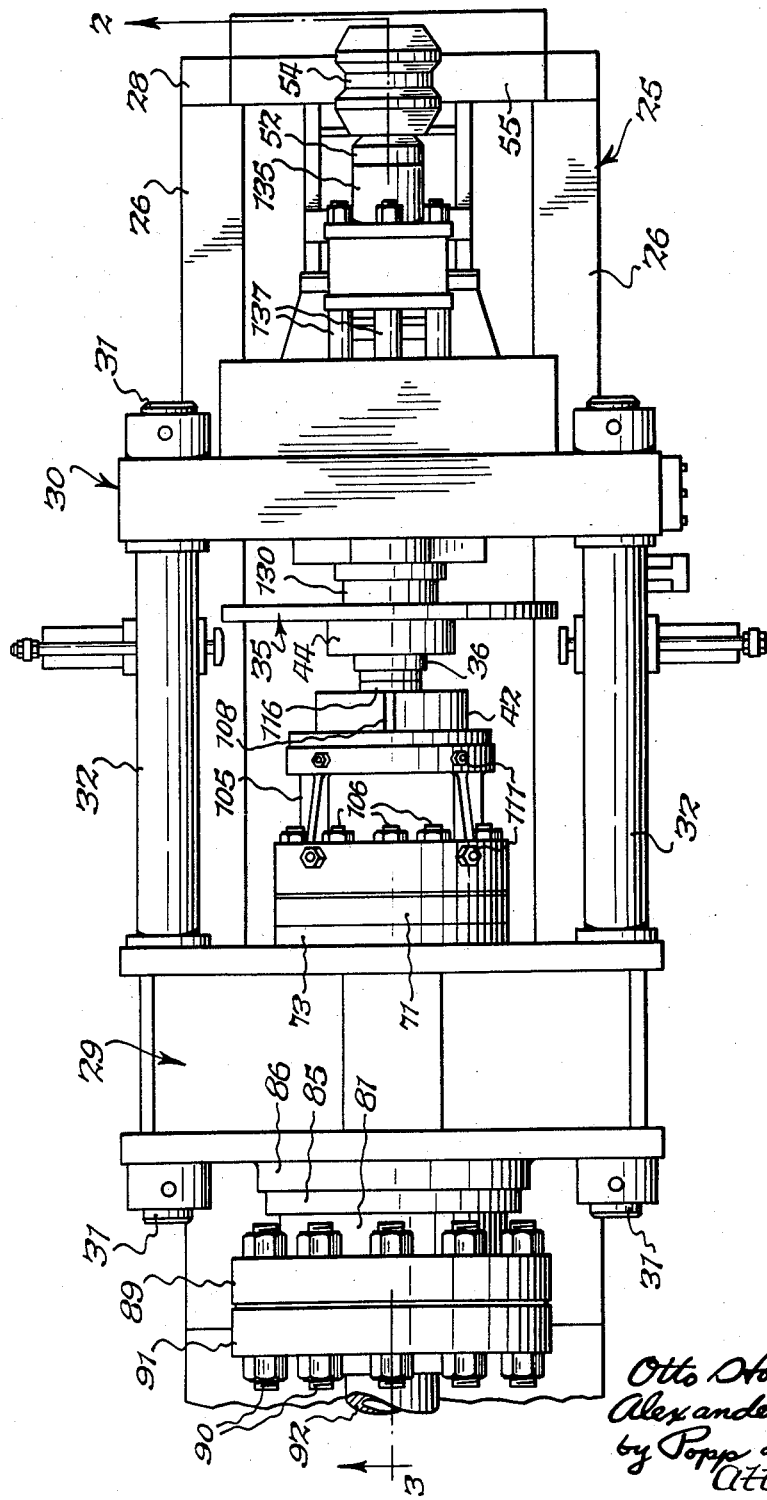
Fig. 1 is a fragmentary top plan view of an extrusion press embodying the present invention with parts removed for clarity.

While with suitable dies and punches the extrusion press forming the subject of the present invention can produce a wide variety of extrusions, it is illustrated, as shown in Figs. 4 and 5, as producing from a cylindrical billet 20 of high carbon steel a cold extrusion in the form of a cylindrical double concave ended coupling 21 having at one end a relatively long coaxial cylindrical socket 22 and having at its opposite end a relatively short coaxial hexagonal socket 23, the two sockets being separated by a partition 24. High carbon steels, say, 10 to 35 carbon steels, have poor cold flow characteristics and the present press is capable of producing cold flow extrusions from high carbon steel billets with true and polished inside and outside finish and size at a rate well in excess of 525 extrusions per hour. The present press shown is designed for producing cup-shaped articles, particularly where two punches are required, although features of the invention are applicable to the production of other types of cold flow extrusions.

Figure 8:
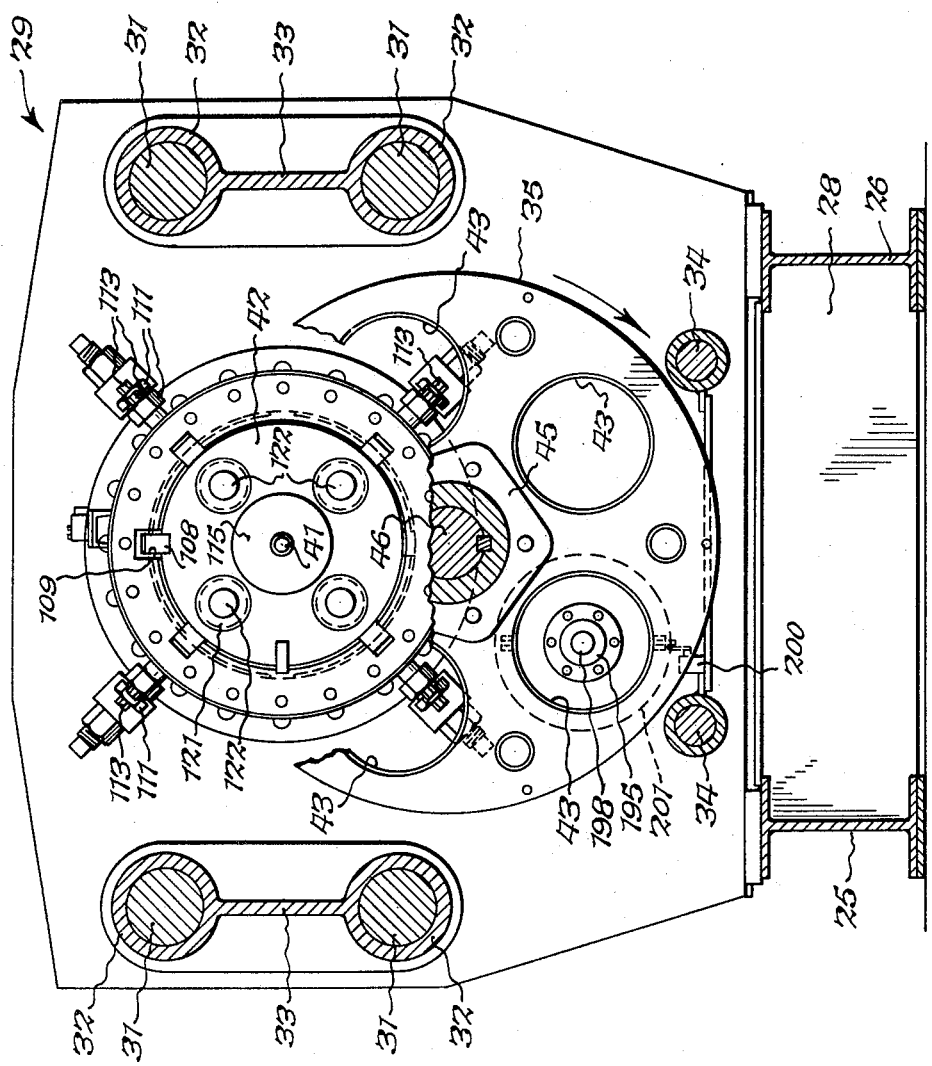

The press is shown as mounted on a bed or subframe 25 including longitudinal beams 26 and cross beams 28, this bed or subframe also including elevated bridges, brackets, beams and plates for supporting the various other parts of the press as hereinafter described. The bed or subframe 25 carries a cylinder platen 29 and a fixed punch platen 30. The cylinder platen 29 and fixed punch platen 30 are shown in Figs. 1, 2, 3, 7 and 8 as being connected together by four upper horizontal columns 31 to resist the tendency of these platens to spread apart under the heavy forces imposed during extrusion. The portion of each of these columns between these platens can be housed in a sleeve 32 at each side of the press. The sleeves 32 at each side of the press can be connected by a vertical web 33 as best shown in Figs. 7 and 8. The cylinder and fixed punch platens 29, 30 are additionally shown as connected together by a pair of small horizontal bottom columns 34 as shown in Figs. 6 and 7.

Interposed between the cylinder platen 29 and the fixed punch platen 30 is a dial 35, Figs. 1, 2 and 7–16, which carries an annular series of open ended dies 36, Figs. 2, 9, 10 and 12–16, in the through bores 38, Figs. 13–16, in which the billet 20 is formed into the coupling 21 or other extruded product by a fixed punch 40 carried by the fixed punch platen 30 and a movable punch 41 carried by a main ram 42 mounted in the cylinder platen 29. The dial 35 is shown, Figs. 8–16, as having an annular series of five uniformly spaced holes 43 in each of which a corresponding tapered die 36 is held by means of a die block 44 which can be secured to the face of the dial 35 in any suitable manner (not shown). Each die 36 and its block 44 is shown as extending only part way into the corresponding opening 43 in the dial 35 so as to leave a part of this opening in the form of a pocket facing the fixed punch platen 30.

An important feature of the invention resides in the means for supporting and actuating the dial 35. This dial is fixed, as best shown in Fig. 2, against an enlargement 45 of a coaxial shaft 46 by means of a large nut 48 and this shaft 46 is journalled in a bearing 49 in the fixed punch platen 30. The shaft 36 extends through this fixed punch platen 30 and is also journalled in a bearing 50 mounted in an upward extension 51 of the subframe or bed 25. The shaft 46 extends into an enlarged cylindrical hub or coupling 52 fixed to the shaft 53 of a hydromotor 54, this hydromotor being mounted on an elevated cross beam 55 forming part of the bed or subframe 25, as best shown in Fig. 2.

Intermediate the fixed punch platen 30 and the upward extension 51 of the subframe 25 a channelled collar is fixed to the shaft 46. In the channel of this collar is fitted a ring 59 provided with a pair of radially projecting horizontal pins 60 each of which is pivotally secured to the upper end of a lever arm 61 the lower end of each of which lever arms is pivoted at 62 to a sliding block 63 guided in a bracket 64 carried by the fixed punch platen 30. The lever arms 61 are reciprocated by a piston contained within a hydraulic cylinder 65 and having a piston rod 66 pivotally connected, as indicated at 68, to the central parts of the lever arms 61. The cylinder 65 is pivotally mounted on the bed 25, as indicated at 69, and fluid pressure can be applied to either end of this cylinder to project or retract the piston rod 66 and hence to reciprocate the shaft 46.

The hydromotor 54 is of the oscillatory type, oscillating its shaft 53 and the hub or coupling 52 fast to this shaft through an arc of 72° or one-fifth of a complete revolution so as to bring each of the five dies 36 on the dial 31 progressively to the successive stations for feeding, forming, detecting defects and discharging from one side or the other of the press. The hub or coupling 52 of this hydromotor 54 has a bore 70 which closely fits the shaft 46 and communicates at the end toward the hydromotor 54 with an enlarged chamber 71 and at its opposite open end is enlarged to receive a bearing bushing 72. The bore 70 is provided with five longitudinal keyways 73 opening at one end into the chamber 71. These keyways 73 are arranged to receive a key 74 in the shaft 46 which, upon longitudinal movement of the shaft 46 by the piston rod 66 from the hydraulic cylinder 65, moves from the chamber 71 into one of the keyways 73 to couple the shaft 46 with the hydromotor 54, and upon reverse rectilinear movement of the shaft 46 moves from a keyway 73 into the chamber 71 to uncouple the shaft 46 from the hydromotor 54.

To insure exact registry of each die 36 with each of the successive stations, the hub or coupling 52 is provided with a pair of radially outwardly projecting stops 75, Fig. 6, the under faces of which come into contact with fixed stops 76 mounted on a cross bar 78 which forms part of the bed or frame 25 of the press. The stops 75 are shown as backed and reinforced by a pair of semicircular ribs 79, Figs. 2 and 6, and the oscillation of the hub or coupling 52 permitted by the stops 75, 76 is exactly that required to bring the dies 36 into correct register at each of the five stations.

The cylinder platen 29 is provided with a horizontal through bore 80, to receive the main cylinder indicated generally at 81 and which main cylinder is open at its opposite ends. At its end toward the fixed punch platen 30 the cylinder 81 is provided with a radial enlargement 82 and a spacer ring 83 is interposed between this radial enlargement 82 and the corresponding face of the cylinder platen 29. The axial extent of the spacer ring 83 can be selected to suit the desired position of the cylinder 81. The opposite end of the cylinder 81 is externally threaded to receive an adjusting screw ring 85 which bears against a ring 86 welded to the platen 29 and having one or more set screws 88 which serve to adjust the lateral position of the main cylinder 81 with reference to the cylinder platen 29. Also screwed on the externally threaded end of the main cylinder 81 is a ring 89 carrying an annular series of large bolts 90 which screw an end head 91 to the main cylinder 81. A coupling 92 can be secured to this end head 91 in register with an opening 93 therein, pressured hydraulic fluid being admitted to and relieved from the cylinder 81 through this fitting.

The main cylinder 81 is provided adjacent but spaced from its open end facing the fixed punch platen 30 with an internal cylindrical portion 95 of reduced diameter which embraces a reduced portion 96 of the main ram 42. A clearance is provided between these reduced portions 95 and 96 of the cylinder and ram, respectively, and this reduced portion 95 of the cylinder provides a pull back chamber 98.

The ram 42 is provided with a piston portion 99 which is provided with a series of piston rings 100 and its end adjacent the end head 91 is in the form of a cylinder bearing face 101 which closely fits the cylinder 81 in order to provide the required accuracy at the opposite end of the ram which carries the movable punch 41. A packing 102 is provided in the end of the main cylinder 81 opposing the fixed punch platen 30 and around the ram 42. A cylindrical extension or ring 105 is also attached to this end of the main cylinder 81, as by the stud and nut connections 106 shown in Fig. 1. A key 108 and keyway 109, Fig. 2, prevent rotation of the main ram in the cylindrical ring 105.

In the bore of the cylindrical extension or ring 105 of the main cylinder 81 are arranged a plurality of bearing members or segments 110 which segments jointly embrace and guide the end of the main ram 42 which carries the movable punch 41. The form and mounting for these bearing members 110 is described in detail in the copending application of Otto Hoffmann, Serial No. 643,402, filed March 1, 1957, and now abandoned, for Device for Adjustably Attaching Parts to which reference is made for a more detailed description. In general, however, each of these bearing segments 110 is supported against the end of a tubular externally threaded screw 111 working in a radially extending threaded hole 112 in the tubular extension or ring 105 of the main cylinder 81. Two of such tubular screws 111 are shown as provided for each segment 110 and it will be seen that upon screwing in the screws 111 the corresponding segment 110 will be moved inwardly thereby to shift the punch end of the ram 42 in a corresponding direction. After the punch end of the ram has been exactly aimed so that the movable punch 41 is in specified alinement with the die 36, the various tubular screws 111 can be locked in such adjustment. For this purpose each tubular screw 111 houses the shank of a screw 113 which has threaded engagement with the corresponding bearing segment 110. The heads of each pair of the screws 111 and 113 contact each other and it will be seen that by tightening the solid screws 113 the tubular screws 111 will be locked to each other.

The punch 41 is shown as secured in the projecting end of the ram 42 by means of blocks 115 and 116. The end face of the block 115 contacts the opposing end face of the die 36 to provide a parting line which is indicated by the dot-dash line 118 in Fig. 2.

Heavy pressures are involved in forcing the movable punch 41 into the billet 20 to produce the coupling 21 and hence heavy forces are involved in extracting the movable punch 41 from the coupling or extrusion. The dial 35 would be incapable of resisting such extracting forces and hence means are provided for holding the die 36 against movement while the movable punch 41 is being extracted. For this purpose, as best shown in Figs. 2, 3 and 8, the ram 42 is provided with a plurality of parallel annular cylinders or bores 120 which are arrranged equidistant from the axis of the ram and extend inwardly from the end face of the ram which opposes the fixed punch platen 30. The outer end of each bore 120 is internally threaded and in this end is screwed a bearing bushing 121 in which a piston rod 122 is slidingly fitted. Each piston rod 122 is fixed to a piston 123 fitted in the corresponding cylinder 120 and the ends of the several piston rods 122 are arranged to contact the end face of the corresponding block 44 which carries the die 36 in line with the punches. A conduit 124 connects each cylinder 120 with the chamber 98 of the main cylinder at the side of the piston toward the fixed punch platen 30 as best shown in Fig. 3.

Figure 13:
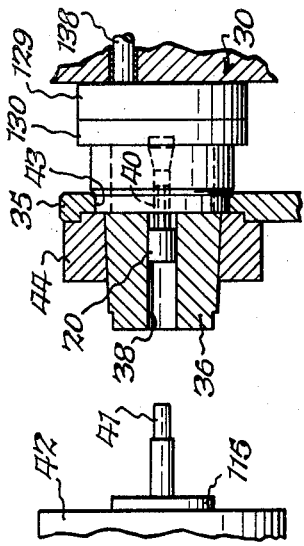
Fig. 13 is a view similar to Fig. 12 showing the position of the parts with the die and fixed punch when mated.
Figure 14:
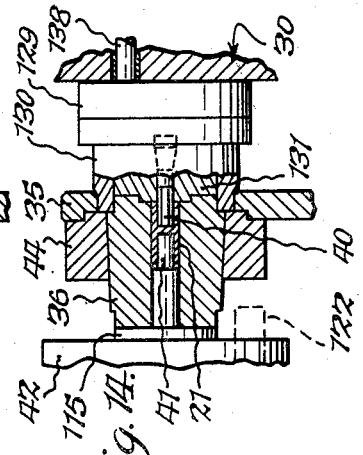
Fig. 14 is a similar view with the main ram having been advanced to complete the extrusion operation and showing in section and in greater detail the mechanism for extracting the fixed punch.
Figure 15:
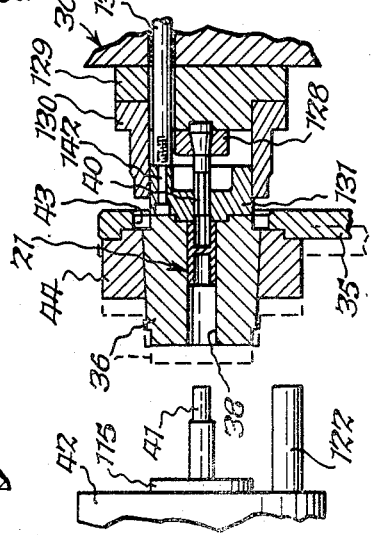
Fig. 15 is a similar view showing both the fixed and movable punches retracted and also showing the main ram retracted.
Figure 16:
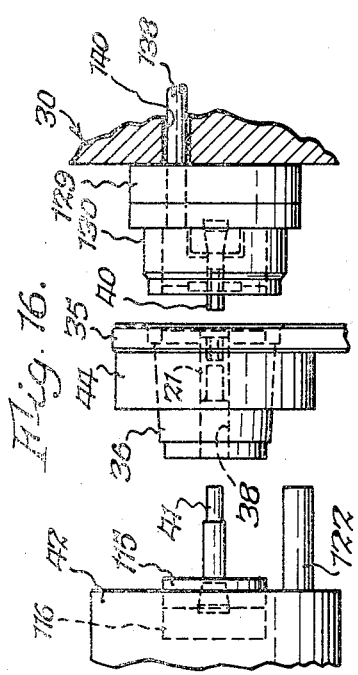
Fig. 16 is a similar view showing the dial completely freed and ready for the next step in its rotation.

As best shown in Fig. 15 the fixed punch 40 is held by a cylindrical block 128 against another circular block 129, the latter being secured to the face of the fixed punch platen 30 which opposes the dial 35. Also fixed to the punch anchor block 129 is a cylindrical sleeve 130 which projects toward the dial 35 and the rim of which is arranged to enter each pocket 43 of the dial 35 and abut against the die 36 and its block 44 as best shown in Figs. 13–15. Slidable within the bore of this sleeve 130 is a collar 131 which functions to extract the extrusion 31 from the fixed punch 40. This collar 131 has a central axial bore through which the fixed punch 40 is projected when the collar 131 is retracted as best shown in Figs. 14 and 16 and into which the fixed punch 40 is retracted when the collar 131 is projected from the sleeve 130 as best shown in Fig. 15. The rim of the sleeve 130, as best shown in Figs. 13 and 14, is arranged to enter each opening 43 in the dial and engage the end of each die 36 and its die block 44 when the dial 35 is moved axially toward the fixed punch platen 30. In this position of the sleeve 130, the fixed punch 40 is in its operative position, that is, it is projected into the bore 38 of a die 36 to position the billet 20 therein as shown in Fig. 13 and to form the coupling 21 or other extrusion therein as shown in Fig. 14. In this position the collar 131 is retracted into the bore of the sleeve 130 as shown in Fig. 14.

The collar 131 mates with the end face of the die 36 to enclose the bore 38 therein, as shown in Figs. 14 and 15, and is forced against the die 36 and extrusion 21 to extract the fixed punch 40 from the extrusion, this occurring while the dial is being moved axially toward the cylinder platen 29. This fixed punch extracting force is provided by a piston in a hydraulic cylinder 135 which piston actuates a piston rod 136. The cylinder, as best shown in Figs. 1, 2 and 6, is secured by studs 137 to the fixed punch platen 30, three studs being shown. The cylinder 135 is in coaxial alinement with the fixed punch 40 and a triangular cross head 139 is fast to the piston rod 136. Three rods 138 are fast to this cross head 139 concentric with the fixed punch 40, these rods extending through bores 140 in the fixed punch platen as shown in Fig. 2. These push rods 138 also extend through bores 141 in the block 129 carrying the fixed punch 40 as best shown in Figs. 7 and 14. The ends of these rods abut and are secured by screws 142 to the collar 131 as best shown in Fig. 14. It will therefore be seen with the extrusion formed and the dial 35 free to move toward the cylinder platen 29, the fixed punch 40 can be extracted from the extrusion by introducing fluid in the cylinder 135 to drive the rods 138 and collar 131 toward the cylinder plates 29 thereby to retract the fixed punch 40 into the collar 131, and hence to extract it from the extrusion 21.

Means are provided at one station with which the dies 36 come into register for loading the billets 20 into the dies. This station, as best illustrated in Figs. 7 and 9, is the station immediately preceding the extrusion station aligning with the fixed and movable punches 40 and 41. These loading means are preferably constructed as follows:

The numeral 145 represents a loading tube which, as best shown in Figs. 7 and 9, is provided with an end flange 146 secured, as by screws 148, to the face of the fixed punch platen 30 in line with a bore 149 through the fixed punch platen. This loading tube alines with each die 36 at the station preceding the station at which each die 36 comes into register with the punches 40 and 41. The loading tube 145, as best shown in Figs. 7 and 9, has a billet inlet opening 150 in one side which alines with a feed chute 151. As best shown in Fig. 7 this chute is inclined and can extend through and be supported by the web 33 connecting the tubular housings 32 of the horizontal columns 31 at one side of the press. The billets 20 are supplied to the chute 151 by any suitable mechanism (not shown) and roll through the side opening 150 into the billet loading tube 145. From this tube the billet is projected into the die 36 alining therewith by a loading mechanism which is preferably constructed as follows:

As shown in Fig. 9 the bore 149 in the fixed punch platen 30 is provided adjacent the billet loading tube with a bearing bushing 152 which slidingly supports one end of a push rod 153. The opposite end of the push rod 153 is fast to the piston rod 154 of a piston in an air cylinder 155. One end of this cylinder is shown as being secured to the fixed punch platen 30 and the opposite end as being secured to a transverse angle bar 158 forming part of the subframe or bed 25 of the press. The piston rod 154 is shown as also projecting from the back end of the cylinder 155 and as carrying a disk 159 engageable with and operating a pair of spaced fixed limit switches 160 and 161 which control the extent of movement of the piston rod 154 in either direction following introduction of air under pressure into the cylinder 155 to project and withdraw the push rod 153. It will be seen that after a billet has been deposited from the chute 151, Fig. 7, through the side opening 150 in the billet loading tube 145, this billet, Fig. 9, will be projected into the bore 38 of the die 36 by introducing air under pressure into the cylinder 155 to project the push rod 153. Following such insertion of the billet into the die, the limit switch 161 is actuated to reverse the air pressure connections of the cylinder 155 and to withdraw the push rod 153 to the position shown in Fig. 9.

Means are provided at the station succeeding the extrusion station in line with the punches 40 and 41 for detecting a broken fixed punch 40 or movable punch 41, this being done by feelers detecting corresponding malformations in the extrusion 21. These broken punch detecting means are shown as constructed as follows:

Referring to Figs. 7, 10 and 11, the numeral 165 represents a bore through the fixed punch platen 30 alining with the die 36 halting at this station. At opposite ends of this bore are arranged bearing bushings 166 which slidingly support a feeler rod 168. The end of this feeler rod 168 toward the dial 35 is threaded and carries a washer 169 held against a nut 170 by a helical compression spring 171. The opposite end of the helical compression spring 171 bears against a block 172 secured to the face of the fixed punch platen 30 facing the dial 35 by screws 173. This block 172 is provided with a bore 174 slidingly supporting one end of a feeler tube 175 which houses the feeler rod 168 and its helical compression spring 171 and guides the washer 169. This feeler tube 175 functions to detect a broken movable punch 41 while the feeler rod 168 functions to detect a broken fixed punch 40, such detection being through corresponding malformations in the extrusion 21. The feeler tube 175 is biased toward the dial 35 by another helical compression spring 176 interposed between the block 172 and an enlargement 178 of the tube 175. An L-shaped bracket 179 is fast to the enlargement 178, this L-shaped bracket having a horizontal leg 180 riding on the top face of the block 172. A guide rod 181 anchored in the block 172 guides the L-shaped bracket 179, and hence the feeler tube 175 and feeler rod 168, toward the dial 35. A screw 182 anchored in the block 172 and working in a slot 183 limits movment of the L-shaped bracket 179 under the influence of the springs 171, 176. The L-shaped bracket carries an adjustable cam 184 which actuates an electrical switch 185 which can be in the main motor circuit of the press. When, upon contacting the extrusion 21, the feeler sleeve 175 travels too far because of a broken movable punch 41 and a corresponding defective distortion of the extrusion 21, the switch 185 is actuated to break the main motor circuit of the press and hence stop the press.

The end of the feeler rod 168 opposite from the dial 35 carries a head 186 engaging the arm of an electrical switch 188 which can also be in the main motor circuit of the press. When upon contacting the extrusion 21 the feeler rod is pushed back too far by an imperfect extrusion caused by a broken fixed punch 40 and a corresponding defective distortion of the extrusion 21, the switch 188 is actuated to break the main motor circuit and stop the press.

Means are provided for discharging the completed extrusions 21 at either side of the press at one of the two stations following the sensing station at which any defective extrusions are detected. These discharging means are best illustrated in Figs. 2, 7 and 17 and are preferably constructed as follows:

The numeral 190 represents a discharge tube at each of the two stations following the sensing station and preceding the loading station. Each discharge tube 190, as best shown in Figs. 2, 7 and 17, is provided with a flange 191 secured, as by screws 192, to the face of the fixed punch platen 30. Each of these discharge tubes 190 aline with each die 36 and is provided in its underside with an opening 193. These openings 193 incline in opposite directions with reference to each other, each inclining downwardly and away from the center of the press. One or the other is used depending on which side of the press is required to be the discharge side and as illustrated in the drawings this discharge side is the right hand side of the press, as viewed in Fig. 7. This operative discharge tube 190 has its discharge opening 193 alining with a chute 194 through which the extrusions roll away from the press. The companion discharge tube 190 is not used.

Figure 17:
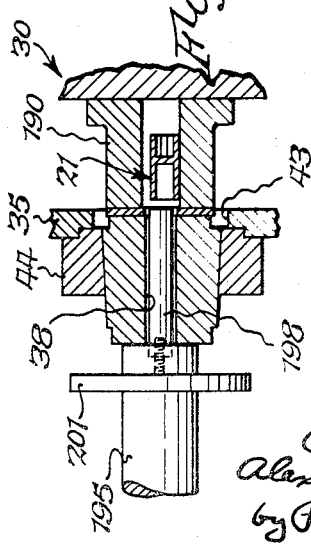
Fig. 17 is a vertical longitudinal section taken generally on line 17—17, Fig. 7 and illustrating the extrusion discharge mechanism.

As with the loading tube 145, the outboard end of each discharge tube 190 is arranged to fit against the face of the die 36, as shown in Fig. 17, when the dial 35 is moved in a corresponding direction.

The extrusion 21 is, of course, tight in the bore 38 of the die 36 and hence considerable force is required to eject it from this bore into the operative discharge tube 190. The extrusion discharge is effected by a horizontal discharge ram 195 in a cylinder 196 fixed in the cylinder platen 29. Fixed to the end of the discharge ram projecting from the cylinder 196 is a push rod 198 which is arranged to enter the bore 38 of the die 36 arranged at the discharge station. This push rod encounters the finished extrusion 21 in this bore and ejects it from this bore into the corresponding discharge tube 190. Thence the extrusion 21 falls down the opening 193 into the discharge chute 194. The pressure imposed by the discharge ram 195 is resisted by the face of the discharge tube 190 which engages the face of the die 36 from which the extrusion is being pushed by the push rod 198.

The movement of the discharge ram 195 can be controlled in any suitable manner, as by a pair of limit switches 199 and 200. These, as shown in Fig. 2, can be arranged to be engaged by a disk 201 fast to the ram 195 and limit the movement of the ram in both directions.

*Operation*

Figure 12:
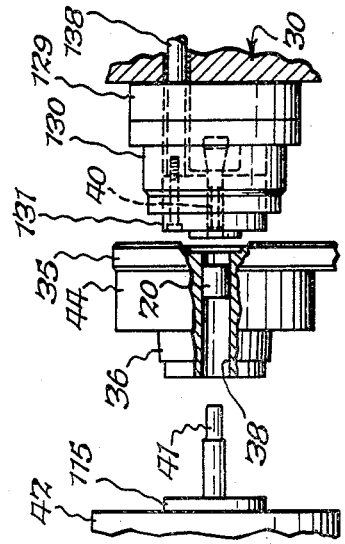
Fig. 12 is a section taken generally on line 12—12, Fig. 7 and showing the position of the parts preparatory to bringing the punches into mating engagement with a die.

In describing the operation of the extrusion press it will be assumed that the main ram 42 and hence the movable punch 41 are in their retracted position shown in Figs. 12 and 13. It will also be assumed that the dial 35 is axially in its inoperative position, see Fig. 16, that is, away from the fixed punch platen 30 with its dies and die blocks 36, 44 spaced from the loading tube 145; sleeve 130 and collar 131 surrounding the fixed punch 40; sensing devices 168 and 175; and discharge tubes 190 carried by the fixed punch platen 30. It will also be assumed that the billet loading push rod 153 is in the fully retracted position shown in Fig. 9; that the discharge push rod 198 is in its fully retracted position; and that the four piston rods 122 which insure stripping of the movable punch 41 from the extrusions and the three push rods 138 for stripping the fixed punch from the extrusion are likewise in their retracted positions. It will also be understood that the billet loading, extruding, sensing inperfections, and extrusion discharging functions are performed simultaneously at the successive stations around the dial and that the press can be fully automatic but for clarity the cycle of operations will be described in connection with a single billet 20 being formed into a finished extrusion 21.

It will also be assumed that the dial 35 is correctly indexed, that is, that the several dies 36 are in alinement with the loading tube 145, punches 40 and 41, sensing devices 168, 175 and discharge tubes 190 at the several stations for these operations.

As the first step in a cycle of operations, fluid under pressure is introduced into the left hand end of the cylinder 65 as viewed in Fig. 2 to retract the piston rod 66 and swing the lever arms 61 clockwise, as viewed in this figure. Through the ring 59 this moves the shaft 46 axially to the right as viewed in this figure thereby to move the dial 35 toward the fixed punch platen 30 until engagement is effected between the die and die block 36, 44 at the extrusion station and the sleeve and collar 130, 131 surrounding the fixed punch 40 as shown in Fig. 14.

At this time, as hereinafter described in detail, the extrusion cycle commences.

While the dial 35 is so being moved axially to its operative position, a cylindrical billet 20, Fig. 4, can be admitted from the feed chute 151, Fig. 7, through the side opening 150 into the open ended loading tube 145 so as to be in the position shown in Fig. 9.

This axial movement of the dial 35 and its shaft 46 to the right as viewed in Fig. 2 also moves the key 74 on this shaft 46 out of engagement with the corresponding internal keyway 73 in the hub or coupling 52. Accordingly this hub or coupling 52 is disconnected from the shaft 46. Pressurized fluid is then admitted to the hydromotor 54 to effect its retrograde or return oscillation. This oscillation is 72° or one-fifth of a revolution corresponding to the number of dies 36 carried by the dial 35. This degree of movement is determined by the spacing of the fixed stops 76, Fig. 6, with reference to the movable stops 75 on the hub or coupling 52 and which are set to provide the required 72° oscillation to index the dies 36 in correct relation to the several stations at which operations are performed.

Air under pressure is admitted to the back end of the cylinder 155, Fig. 9, to project the piston rod 154 and push rod 153 to the left as viewed in this figure. The push rod 153 pushes the cylindrical billet 20 axially out of the loading tube 145 on the fixed spindle platen 30 into the position shown in Fig. 12, that is, into the bore 38 of the die 36 in alinement with the loading tube 145 at this feeding station. When the disk 159 on the rod 154 engages the limit switch 161 means (not shown) reverse the air pressure in the cylinder 155 to retract the push rod 153. When the limit switch 160 is contacted the movement of the push rod 153 is halted.

At this time, as hereinafter described in detail, the extrusion cycle is completed.

Pressurized fluid is then admitted to the back of the cylinder 65, Fig. 2, to extend its piston rod 66 and swing the lever arms 61 counterclockwise as viewed in this figure. Through the ring 59 this moves the shaft 46 and dial 35 toward the left and also moves the key 74 on this shaft 46 into one of the keyways 73 of the hub or coupling 52 of the hydromotor 54. Accordingly this hydromotor is coupled to this shaft to advance the dial 35 one step.

This step is one-fifth of a revolution or 72° and is effected by introducing pressurized fluid into the hydromotor 54 to advance the die 36 so filled with a billet 20 to the top or extrusion station. The advance oscillation of the hydromotor 54 is controlled to be 72° and to obtain exact indexing of the dial 35 each time by the fixed stops 76, Fig. 6, engaging the movable stops 75 on the hub or coupling fast to the hydromotor 54.

With the dial so advanced one step, the die 36 just filled with the billet 20 is brought into register with the fixed and movable punches 40, 41, as shown in Fig. 12, and the parts surrounding these punches. Pressurized fluid is then applied to the left hand end of the cylinder 65, Fig. 2, to retract its piston rod 66 and swing the rock arms 61 clockwise. Through the ring 59 this moves the shaft 46 and dial 35 to the right as viewed in this figure thereby to bring the die just filled with the billet 20 into engagement with the sleeve 130 and collar 131 surrounding the fixed punch 40, as shown in Figs. 13 and 14. At this time, as assumed at the beginning of this description of the operation, the cylinder 135, Fig. 2, is supplied with pressured fluid to hold its piston rod 136 and the three rods 138 retracted, thereby to hold the collar 131 retracted and the fixed punch 40 projected therefrom, as shown in Fig. 14. Accordingly this fixed punch 40, upon the above movement of the dial 35 to the right from the position shown in Fig. 12, enters the bore 38 of the die 36 as shown in Fig. 13 and can contact the billet 20 therein as shown.

Pressurized fluid is now admitted from the fitting 92, Fig. 3, into the main cylinder 81 behind the piston part 99 of the main ram 42. Accordingly this main ram is moved to the right to be projected from the main cylinder 81 and the movable punch 41 at its free end is projected into the bore or cavity 38 of the die under consideration as shown in Figs. 2 and 14. On encountering the billet 20 the metal of this billet is forced to flow around the fixed punch 40 and thereby form the hexagonal bore 23 in the product, Fig. 5. The metal is also forced to flow around the movable punch 41 thereby to provide the cylindrical bore 22 in the product. The metal is also forced against the bore 38 of the die 36 to provide an accurate and polished periphery on the product, this also applying to the bores 22, 23.

In causing such extrusion of the metal, particularly with high carbon steel billets, the punches 40 and 41 are tenaciously adhered in the extrusion and considerable power is required to strip each from the extrusion. Also the disk-like dial 35 is not of itself capable of resisting such punch stripping forces. Accordingly, means are provided for holding each die 36 axially immobile while the movable punch 41 is being extracted from the extrusion therein, and extracting means are provided for forcing each die 36 axially away from the fixed punch platen 30 to extract the fixed punch 40 therefrom, the operation of these holding and extracting means being as follows:

Following extrusion the main ram 42 is withdrawn by introducing pressurized fluid into the pullback chamber 98, Fig. 3, on the punch side of the piston part 99. Through the passage 124 this applies pressure to the four cylinders 120, Fig. 2, thereby to project the plungers 122. These plungers push against the rim of the die block 44 at the extrusion station (see Figs. 15 and 16) and prevent the displacement of the die and hence the upper part of the dial 35 toward the cylinder platen 29 while the movable punch 41 is being stripped from the bore 22 in the extrusion 21.

To extract the fixed punch 40 from the extrusion 21, in addition to introducing pressurized fluid into the back end of the cylinder 65, Fig. 2, thereby, through the rock levers 61, ring 59 and shaft 46 to move the dial 35 and dies 36 away from the fixed punch platen 30 and its fixed punch 40, pressurized fluid is also introduced into the back end of the cylinder 135, Fig. 2. This projects its piston rod 136 and the three rods 138 to the left as viewed in Fig. 2. This projects the collar 131 fast to the opposite ends of these rods 138 as best shown in Fig. 15 to the left thereby to push against the extrusion 21 and die 36 and to retract the fixed punch 40 into the collar 131 and hence forcibly strip it from the extrusion 21. After the fixed punch 40 has been so extracted from the extrusion 21, pressurized fluid is introduced into the left hand end of the cylinder 135, as viewed in Fig. 2, thereby to withdraw the piston rod 136, three rods 138 and the collar 131 attached to these rods 138 as shown in Figs. 2 and 14. The fixed punch 40 is thereby projected from this collar 131 and the parts are in the position shown in Fig. 16, the pressurized fluid supplied to the back end of the cylinder 65, Fig. 2 having shifted the shaft 46 and dial 35 to the left during this fixed punch extraction step.

During these extrusion and punch extraction steps the next succeeding die is being filled with a billet 20 and hence, as previously described, during the steps of extruding, and extracting the movable punch 41, the hydromotor 54, Fig. 2, is actuated to swing its hub or coupling 52 through a retrograde oscillation of 72°, the key 74 being withdrawn from the keyways 73 at this time so as to permit this retrograde movement.

With the extrusion and punch extraction steps completed and the parts positioned as shown in Fig. 16, pressurized fluid is admitted to advance the hydromotor 54, Fig. 2, one-fifth of a revolution or 72°, this being determined by the stops 75, 76, Fig. 6, which determine such 72° movement. At this time one of the keyways 73, Fig. 2, of the hub or coupling 52 of this hydromotor is engaged with the key 74 of the shaft 46 so that this advance oscillation of the hydromotor 54 is transmitted to the shaft 46 to advance the dial 35 one step. This brings the die 36 containing the extrusion 21 into line with the sensing devices 168 and 175, Figs. 10 and 11.

Pressurized fluid is now admitted to the left hand end of the cylinder 65, Fig. 2, thereby through the lever arms 61, ring 59 and shaft 46 to move the dial 35 toward the fixed punch platen 30 or toward the left as viewed in Figs. 10 and 11. This movement of the shaft 46, Fig. 2, frees the key 74 from the engaged keyway 73 in the hub or coupling 52 so that the hydromotor 54 is now free from drive connection. Pressurized fluid is admitted to this hydromotor to effect its retrograde oscillation of 72° as determined by its stops 75, 76, Fig. 6.

This movement of the dial 35 axially to the left as viewed in Figs. 10 and 11 brings the end of the extrusion 21 into engagement with the end of the feeler sleeve 175 and pushes this sleeve against the resistance of the helical compression spring 176 toward the fixed punch platen 30. This also moves the L-shaped bracket 179 to the left, the normal travel of this bracket being such that the roller on the arm of the electrical switch 185 rides along the salient face of the cam 184 and down its inclined face, as shown in Fig. 11, so as to actuate the switch. If the movable punch 41 should be broken, it would, of course, displace less metal around the fixed punch 40 and as a consequence the extrusion 21 would be abnormally short, particularly in the length of the metal forming the hexagonal socket 23. Hence this rim of metal surrounding the hexagonal recess 23 will reach an insufficient distance toward the fixed punch platen 30 and when this rim is moved to contact and push the feeler sleeve 175, this movement will be insufficient to cause the cam to release the arm of the switch 185, that is, this switch arm will not ride off the salient or top face of this cam to the position shown in Fig. 11. This switch 185 must be released to the position shown in Fig. 11 in order to continue the operation of the press and hence the press will be stopped by reason of the feeler tube 175 being pushed against the spring 176 an insufficient distance for the salient face of the cam 184 to release the switch 185 to the position shown in Fig. 11 due to the extrusion being too short because of a broken movable punch 41 and a consequent insufficient displacement of metal.

This movement of the dial 35 axially to the left, as viewed in Figs. 10 and 11, also brings the partition 24 of the extrusion 21 into engagement with the end of the feeler rod 168 and pushes this feeler rod against the resistance of the helical compression spring 177. If the depth of the hexagonal recess 23 produced by the fixed punch 41 is sufficient, this movement of this feeler rod 168 is insufficient to cause the cam head 186 to actuate the arm of the switch 188. This position of the parts with a normal extrusion being subjected to testing is shown in Figs. 10 and 11.

If, on the other hand, the fixed punch 40 is broken, the hexagonal recess 23 produced by it will be of insufficient depth and hence the partition 24 will push the feeler rod 168 an abnormal distance to the left as viewed in Figs. 10 and 11. This will cause the cam 186 at the free end of the feeler rod 168 to not only engage but also move the arm of the electrical switch 188 and hence actuate this switch to stop the press. Of course, with either switch 185 or 188 some warning signal other than actually stopping the press could be effected to indicate the production of a defective extrusion.

If, of course, the extrusion is normal, the switch 185 is actuated and the switch 188 is not actuated and the press continues its operation without interruption. Without such interruption pressurized fluid is introduced into the back of the piston 65, Fig. 2, thereby, through the piston rod 66, rock levers 61, ring 59 and shaft 46, to move the dial 35 axially away from the fixed punch platen 30 and to release the extrusion 21 from the sensing sleeve 175 and sensing rod 163. The key 74 is therefore engaged in one of the keyways 73 and pressurized fluid is applied to the hydromotor 54 to turn the shaft 46 and dial 35 one step. This brings the die 36 containing the extrusion to the first discharge station (lower left, Fig. 7) which is shown as not used since it is assumed that it is desired to discharge the extrusions from the opposite side of the press. Since this first discharge station is inoperative it will be assumed that another cycle of operations has taken place and that the die 65 containing the tested extrusion is now at the operative discharge station, that is, the lower right station, Fig. 7, and in line with the discharge ram 195, Fig. 17.

After the die 65 containing the tested extrusion 21 has so been brought into line with the discharge ram, hydraulic fluid under pressure is introduced into the left hand end of the cylinder 65 as viewed in Fig. 2 to retract the piston rod 66 and swing the lever arms 61 clockwise as viewed in this figure, this being the first step of the cycle of operations as herein described. As initially described, through the ring 59 this moves the shaft 46 axially to the right as viewed in this figure thereby to move the dial 35 toward the fixed punch platen 30 until engagement is effected between the die 36 and the outboard end of the discharge tube 190 as shown in Fig. 17. This die 36 is thereby backed by the discharge tube 190 to withstand the pressures involved in forcing the extrusion from the die.

Pressurized fluid is then introduced in the cylinder 196 to project the ram 195. The push rod 198 on the free end of this ram thereupon engages the end of the extrusion 21 in the alining die 36 and pushes this extrusion from the die, the die being backed against this force by the discharge tube 190. The extrusion is pushed into the discharge tube 190 from which it falls through the side opening 193 into the discharge chute 194. The ram 195 and its push rod 198 are then retracted from the die 36 by introducing pressurized fluid into the opposite end of the cylinder 196. The cycle of operations as herein described is then repeated.

From the foregoing it will be seen that the present invention provides a high speed extrusion press for producing cup-shaped articles from high carbon cold steel billets at a rapid rate and to a high degree of accuracy and finish and that it achieves the various objectives set forth.

We claim:

1. In an extrusion press having a cylinder platen, an open ended main cylinder mounted on said cylinder platen and, a main ram in said main cylinder, the combination therewith of means for aiming said ram in its axial movement comprising a cylindrical ring fast to said cylinder platen in line with the open end of said cylinder and through which said main ram travels, an annular series of individual bearing members surrounding said main ram and interposed between said main ram and ring and means for adjusting each of said bearing members radially with reference to said ring to adjust the aim of said main ram.

2. In an extrusion press, a fixed punch, means holding said fixed punch immobile, a ram movable toward and from said fixed punch in line therewith, a movable punch, means supporting said movable punch on said ram in opposing alinement with said fixed punch, a dial interposed between said punches, means supporting said dial for rotation about an axis parallel with and eccentric to said alined punches, said dial having a series of cavities extending therethrough equidistant from and parallel with said axis and arranged to register with said alined punches, dies severally fixed in said cavities and each having a bore extending therethrough, means arranged to reciprocate said dial lengthwise of said axis to cause said fixed punch to be inserted into and removed from a die alined therewith, means arranged to impart a step-by-step rotative movement to said dial about said axis to bring said cavities progressively into alinement with said alined punches, said ram moving said movable punch into said alined die to extrude a billet therein into the desired form, and means for extracting each of said punches from said deformed billet comprising a member arranged alongside and slidable lengthwise of said fixed punch into operative engagement with the die alined therewith, and means operating to move said member toward said ram to move said alined die and dial away from said fixed punch thereby to extract the fixed punch from the extruded billet.

3. In an extrusion press, a fixed platen, a fixed punch, means holding said fixed punch immobile on said fixed platen, a ram movable toward and from said fixed punch in line therewith, a movable punch, means supporting said movable punch on said ram in opposing alinement with said fixed punch, a dial interposed between said punches, means supporting said dial for rotation about an axis parallel with and eccentric to said alined punches, said dial having a series of cavities extending therethrough equidistant from and parallel with said axis and arranged to register with said alined punches, dies severally fixed in said cavities and each having a bore extending therethrough, means arranged to reciprocate said dial lengthwise of said axis to cause said fixed punch to be inserted into and removed from a die alined therewith, means arranged to impart a step-by-step rotative movement to said dial about said axis to bring said cavities progressively into alinement with said alined punches, said ram moving said movable punch into said alined die to extrude a billet therein into the desired form, and means for extracting each of said punches from said billet comprising a sleeve surrounding said fixed punch and fixed to said fixed platen to project toward said dial and engage the die alined with said fixed punch, a collar slidably arranged in said sleeve in surrounding relation to said fixed punch and movable axially relative to said fixed punch and sleeve, and hydraulically actuated means acting to move said collar toward said ram to move said alined die and dial away from said fixed punch thereby to extract said fixed punch from the extruded billet.

4. In an extrusion press, a fixed punch, means holding said fixed punch immobile, a ram movable toward and from said fixed punch in line therewith, a movable punch, means supporting said movable punch on said ram in opposing alinement with said fixed punch, a dial interposed between said punches, means supporting said dial for rotation about an axis parallel with and eccentric to said alined punches, said dial having a series of cavities extending therethrough equidistant from and parallel with said axis and arranged to register with said alined punches, dies severally fixed in said cavities and each having a bore extending therethrough, means arranged to reciprocate said dial lengthwise of said axis to cause said fixed punch to be inserted into and removed from a die alined therewith, means arranged to impart a step-by-step rotative movement to said dial about said axis to bring said cavities progressively into alinement with said alined punches, said ram moving said movable punch into said alined die to extrude a billet therein into the desired form, and means for extracting each of said punches from said deformed billet comprising a plurality of cylinders in said ram in parallel spaced relation to the axis of said movable punch, pistons in said cylinders, and a piston rod projecting from each piston and operatively engaging the die alined with said movable punch to exert pressure on said die away from said ram while said movable punch is being extracted from said extruded billet.

5. In an extrusion press, a fixed punch, means holding said fixed punch immobile, a ram movable toward and from said fixed punch in line therewith, a movable punch, means supporting said movable punch on said ram in opposing alinement with said fixed punch, a dial interposed between said punches, means supporting said dial for rotation about an axis parallel with and eccentric to said alined punches, said dial having a series of cavities extending therethrough equidistant from and parallel with said axis and arranged to register with said alined punches, dies severally fixed in said cavities and each having a bore extending therethrough, means arranged to reciprocate said dial lengthwise of said axis to cause said fixed punch to be inserted into and removed from a die alined therewith, means arranged to impart a step-by-step rotative movement to said dial about said axis to bring said cavities progressively into alinement with said alined punches, said ram moving said movable punch into said alined die to extrude a billet therein into the desired form, means for extracting each of said punches from said deformed billet, and means for extracting the extruded billet from each die comprising a tubular member arranged in the space between said fixed punch holding means and dial and fixed to said fixed punch holding means to project outward therefrom toward said dial in position for its bore to come into progressive engaging alinement with said dies, and an ejector ram arranged on the side of the dial opposite said fixed punch holding means and in axial alinement with said bore to eject the extruded billet from each die into said bore, said tubular member having an opening in its side through which the extruded billet is removed from said bore.

6. In an extrusion press, a fixed punch, means holding said fixed punch immobile, a ram movable toward and from said fixed punch in line therewith, a movable punch, means supporting said movable punch on said ram in opposing alinement with said fixed punch, a dial interposed between said punches, means supporting said dial for rotation about an axis parallel with and eccentric to said alined punches, said dial having a series of cavities extending therethrough equidistant from and parallel with said axis and arranged to register with said alined punches, dies severally fixed in said cavities and each having a bore extending therethrough, means arranged to reciprocate said dial lengthwise of said axis to cause said fixed punch to be inserted into and removed from a die alined therewith, means arranged to impart a step-by-step rotative movement to said dial about said axis to bring said cavities progressively into alinement with said alined punches, said ram moving said movable punch into said alined die to extrude a billet therein into the desired form, means for extracting each of said punches from said deformed billet, and means for sensing a defective extruded billet comprising a sensing member arranged on the side of said dial remote from said ram in position to come into progressive alinement with and to enter said dies, spring means biasing said sensing member into the alined die to engage the extruded billet therein, means limiting the movement of said sensing member under influence of said spring means, said sensing member being moved against the resistance of said spring means by the extrusion in the alined die when said dial is moved to move said fixed punch into a die, and means for detecting an abnormal movement of said detecting member by said extruded billet.

7. The combination set forth in claim 6 wherein said sensing member is arranged to engage a salient portion of said extruded billet and wherein said detecting means is responsive to an insufficient movement of said sensing member against said spring biasing means.

8. The combination set forth in claim 6 wherein said sensing member is arranged to engage an inner face of a recess in said extruded billet and wherein said detecting means is responsive to an excessive movement of said sensing member against said spring biasing mean.

9. The combination set forth in claim 6 wherein a pair of such sensing members is provided, one sensing member being arranged to engage a salient portion of said extruded billet and wherein the detecting means associated therewith is responsive to an insufficient movement of said one sensing member against its spring biasing means and the other sensing member being arranged to engage an inner face of a recess in said extruded billet and wherein the detecting means associated therewith is responsive to an excessive movement of said sensing member against its spring biasing means.

10. In an extrusion press, a fixed punch, means holding said fixed punch immobile, a ram movable toward and from said fixed punch in line therewith, a movable punch, means supporting said movable punch on said ram in opposing alinement with said fixed punch, a dial interposed between said punches, means supporting said dial for rotation about an axis parallel with and eccentric to said alined punches, said dial having a series of cavities extending therethrough equidistant from and parallel with said axis and arranged to register with said alined punches, dies severally fixed in said cavities and each having a bore extending therethrough, means arranged to reciprocate said dial lengthwise of said axis to cause said fixed punch to be inserted into and removed from a die alined therewith, means arranged to impart a step-by-step rotative movement to said dial about said axis to bring said cavities progressively into alinement with said alined punches, said ram moving said movable punch into said alined die to extrude a billet therein into the desired form, means for extracting each of said punches from said deformed billet, and means for loading a billet into each die comprising an open-ended tubular member arranged in the space between said fixed punch holding means and dial and fixed to said fixed punch holding means to project outwardly therefrom toward said dial in position for its bore to come into progressive alinement with said dies, means for loading a billet through an open side of said tubular member into the bore thereof, a push rod arranged to project the billet from said bore into a die alined therewith, and means actuating said push rod.

11. In an extrusion press, a fixed punch, means holding said fixed punch immobile, a ram movable toward and from said fixed punch in line therewith, a movable punch, means supporting said movable punch on said ram in opposing alinement with said fixed punch, a dial interposed between said punches, means supporting said dial for rotation about an axis parallel with and eccentric to said alined punches, said dial having a series of cavities extending therethrough equidistant from and parallel with said axis and arranged to register with said alined punches, dies severally fixed in said cavities and each having a bore extending therethrough, means arranged to reciprocate said dial lengthwise of said axis first in one direction to cause said fixed punch and its holding means to be respectively inserted into and engaged by a die alined therewith and then in the opposite direction to cause said fixed punch and its holding means to be respectively removed and disengaged from said alined die, means arranged to impart a step-by-step rotative movement to said dial about said axis to bring said cavities progressively into alinement with said alined punches, and means actuating said ram to move said movable punch into said alined die while said fixed punch and its holding means are respectively located in and engaged by said alined die to extrude a billet therein into the desired form.

12. In an extrusion press, a fixed punch, means holding said fixed punch immobile, a ram movable toward and from said fixed punch in line therewith, a movable punch, means supporting said movable punch on said ram in opposing alinement with said fixed punch, a dial interposed between said punches, means supporting said dial for rotation about an axis parallel with and eccentric to said alined punches, said dial having a series of cavities extending therethrough equidistant from and parallel with said axis and arranged to register with said alined punches, dies severally fixed in said cavities and each having a bore extending therethrough, means arranged to reciprocate said dial lengthwise of said axis first in one direction to cause said fixed punch and its holding means to be respectively inserted into and engaged by a die alined therewith and then in the opposite direction to cause said fixed punch and its holding means to be respectively removed and disengaged from said alined die, a key member on said dial supporting means, a coupling member having a keyway engageable with said key member in response to the reciprocation of said dial away from said fixed punch, means oscillating said coupling member an angular distance equal to the angular distance separation of said cavities from one another to impart a step-by-step rotative movement to said dial about said axis to bring said cavities progressively into alinement with said alined punches, and means actuating said ram to move said movable punch into said alined die while said fixed punch and its holding means are respectively located in and engaged by said alined die to extrude a billet therein into the desired form.

13. In an extrusion press, a fixed punch, means holding said fixed punch immobile, a ram movable toward and from said fixed punch in line therewith, a movable punch, means supporting said movable punch on said ram in opposing alinement with said fixed punch, a dial interposed between said punches, means supporting said dial for rotation about an axis parallel with and eccentric to said alined punches, said dial having a series of cavities extending therethrough equidistant from and parallel with said axis and arranged to register with said alined punches, dies severally fixed in said cavities and each having a bore extending therethrough, means arranged to reciprocate said dial lengthwise of said axis first in one direction to cause said fixed punch and its holding means to be respectively inserted into and engaged by a die alined therewith and then in the opposite direction to cause said fixed punch and its holding means to be respectively removed and disengaged from said alined die, a key member on said dial supporting means, a coupling member having a keyway engageable with said key member in response to the reciprocation of said dial away from said fixed punch, a stop on said coupling member, a fixed stop engageable with the first mentioned stop and limiting the rotative movement of said coupling member in the engaged position of said key member to an angular distance equal to the angular separation of said cavities from one another, a hydromator rotatively oscillating said coupling member between said stops to impart a step-by-step rotative movement to said dial about said axis to bring said cavities progressively into alinement with said alined punches, and means actuating said ram to move said movable punch into said alined die while said fixed punch and its holding means are respectively located in and engaged by said alined die to extrude a billet therein into the desired form.

References Cited in the file of this patent
UNITED STATES PATENTS 268,037    McDonald et al.  ---------- Nov. 28, 1882

(Other references on following page)

UNITED STATES PATENTS

| | | |
|---|---|---|
| 922,392 | Christianson | May 18, 1909 |
| 2,128,705 | Hatebur | Aug. 30, 1938 |
| 2,236,221 | Shwayder | Mar. 25, 1941 |
| 2,382,041 | Ernst | Aug. 14, 1945 |
| 2,449,365 | Bober et al. | Sept. 14, 1948 |
| 2,540,117 | Hunt | Feb. 6, 1951 |
| 2,742,802 | Clarke et al. | Apr. 24, 1956 |
| 2,786,217 | Johnson | Mar. 26, 1957 |
| 2,787,828 | Cousino | Apr. 19, 1957 |

FOREIGN PATENTS

| | | |
|---|---|---|
| 318,113 | Great Britain | Aug. 27, 1929 |
| 1,021,847 | France | Dec. 10, 1952 |